US010620490B2

(12) United States Patent
Drzaic et al.

(10) Patent No.: US 10,620,490 B2
(45) Date of Patent: Apr. 14, 2020

(54) DISPLAYS WITH MINIMIZED BORDER REGIONS HAVING AN APERTURED TFT OR OTHER LAYER FOR SIGNAL CONDUCTORS

(71) Applicant: Apple Inc., Cupertino, CA (US)

(72) Inventors: Paul S. Drzaic, Morgan Hill, CA (US); Jeremy C. Franklin, San Francisco, CA (US); Stephen Brian Lynch, Portola Valley, CA (US); Scott A. Myers, San Francisco, CA (US); Benjamin M. Rappoport, San Francisco, CA (US); Fletcher R. Rothkopf, Los Altos, CA (US); John P. Ternus, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/355,569

(22) Filed: Mar. 15, 2019

(65) Prior Publication Data

US 2019/0212603 A1 Jul. 11, 2019

Related U.S. Application Data

(63) Continuation of application No. 13/253,844, filed on Oct. 5, 2011, now Pat. No. 10,261,370.

(51) Int. Cl.
*G02F 1/1345* (2006.01)
(52) U.S. Cl.
CPC ...... *G02F 1/13452* (2013.01); *G02F 2201/42* (2013.01)
(58) Field of Classification Search
CPC .......................... G02F 1/13452; G02F 2201/42
See application file for complete search history.

(56) References Cited

U.S. PATENT DOCUMENTS

| 2,933,655 A | 4/1960 | Gradisar et al. |
| 3,165,672 A | 1/1965 | Gellert |

(Continued)

FOREIGN PATENT DOCUMENTS

| CN | 1912716 | 2/2007 |
| CN | 101430473 | 5/2009 |

(Continued)

OTHER PUBLICATIONS

SI PO Notification of First Office Action (PCT Application in the National Phase) for Application No. 201280048986.9 dated Oct. 9, 2015 (21 pp. original and English translation), provided by Applicant.

(Continued)

*Primary Examiner* — Andrew Jordan
(74) *Attorney, Agent, or Firm* — Treyz Law Group, P.C.; David K. Cole

(57) ABSTRACT

An electronic device may be provided with a display having a thin-film transistor layer. One or more holes in the thin-film transistor layer may be used to form pathways from display circuitry to other circuitry underneath the display. One or more conductive bridges may pass through holes in the thin-film transistor layer and may have one end that couples to the display circuitry and a second end that couples to a printed circuit underneath the display. These conductive bridges may be formed from wire bonding. Wire bond connections may be encapsulated with potting material to improve the reliability of the wire bond and increase the resiliency of the display. Display signal lines may be routed through holes in a thin-film transistor layer to run along a backside of the display thereby reducing the need for space in the border region for display circuitry.

20 Claims, 12 Drawing Sheets

(56) References Cited

U.S. PATENT DOCUMENTS

| | | | |
|---|---|---|---|
| 4,066,855 A | 1/1978 | Zenk | |
| 4,085,302 A | 4/1978 | Zenk et al. | |
| 4,139,881 A | 2/1979 | Shimizu et al. | |
| 4,394,711 A | 7/1983 | Conley | |
| 4,431,270 A | 2/1984 | Funada et al. | |
| 4,487,993 A | 12/1984 | Becker | |
| 4,549,174 A | 10/1985 | Funada et al. | |
| 4,789,776 A | 12/1988 | Inoue | |
| 4,996,629 A | 2/1991 | Christiansen et al. | |
| 5,235,451 A | 8/1993 | Bryan | |
| 5,276,382 A | 1/1994 | Stocker et al. | |
| 5,436,744 A | 7/1995 | Arledge et al. | |
| 5,483,261 A | 1/1996 | Yasutake | |
| 5,488,204 A | 1/1996 | Mead et al. | |
| 5,493,096 A | 2/1996 | Koh et al. | |
| 5,577,205 A | 11/1996 | Hwang et al. | |
| 5,592,199 A | 1/1997 | Kawaguchi et al. | |
| 5,670,994 A | 9/1997 | Kawaguchi et al. | |
| 5,825,352 A | 10/1998 | Bisset et al. | |
| 5,835,079 A | 11/1998 | Shieh | |
| 5,844,781 A | 12/1998 | Schlotterer et al. | |
| 5,880,411 A | 3/1999 | Gillespie et al. | |
| 5,880,705 A | 3/1999 | Onyskevych et al. | |
| 6,091,194 A | 7/2000 | Swribel et al. | |
| 6,188,391 B1 | 2/2001 | Seely et al. | |
| 6,191,435 B1 | 2/2001 | Inoue | |
| 6,201,346 B1 | 3/2001 | Kusaka | |
| 6,239,982 B1 | 5/2001 | Bozzer et al. | |
| 6,310,610 B1 | 10/2001 | Beaten et al. | |
| 6,323,846 B1 | 11/2001 | Westerman et al. | |
| 6,342,932 B1* | 1/2002 | Terao | G02F 1/13452 349/150 |
| 6,411,353 B1 | 6/2002 | Yarita et al. | |
| 6,421,033 B1 | 7/2002 | Williams et al. | |
| 6,498,592 B1 | 12/2002 | Matthies | |
| 6,560,117 B2 | 5/2003 | Moon | |
| 6,617,177 B1 | 9/2003 | Winer | |
| 6,690,387 B2 | 2/2004 | Zimmerman et al. | |
| 6,774,872 B1 | 4/2004 | Kawada et al. | |
| 6,738,263 B2 | 5/2004 | Corisis et al. | |
| 6,801,174 B2 | 10/2004 | Kayama et al. | |
| 6,815,835 B2 | 11/2004 | James | |
| 7,015,994 B2 | 3/2006 | Marohoshi | |
| 7,184,064 B2 | 2/2007 | Zimmerman et al. | |
| 7,211,738 B2 | 5/2007 | Lee et al. | |
| 7,245,500 B2 | 7/2007 | Kahn et al. | |
| 7,342,354 B2 | 3/2008 | Utsunomiya et al. | |
| 7,417,867 B1 | 8/2008 | Matsuda et al. | |
| 7,663,607 B2 | 2/2010 | Hotelling et al. | |
| 7,791,700 B2 | 9/2010 | Bellamy | |
| 7,796,397 B2 | 9/2010 | Yamauchi et al. | |
| 7,816,721 B2 | 10/2010 | Yamazaki et al. | |
| 7,864,136 B2 | 1/2011 | Matthies et al. | |
| 7,977,170 B2 | 7/2011 | Tredwell et al. | |
| 8,009,260 B2* | 8/2011 | Chen | G02F 1/13452 349/152 |
| 8,148,259 B2 | 4/2012 | Arai et al. | |
| 8,169,588 B2 | 5/2012 | Oikawa et al. | |
| 8,194,222 B2 | 6/2012 | Seki et al. | |
| 8,222,666 B2 | 7/2012 | Hatano et al. | |
| 8,253,914 B2 | 8/2012 | Kajiya et al. | |
| 8,258,523 B2 | 9/2012 | Lee et al. | |
| 8,269,923 B2 | 9/2012 | Yamagishi et al. | |
| 8,362,488 B2 | 1/2013 | Chaug et al. | |
| 8,395,722 B2 | 3/2013 | Mathew et al. | |
| 8,450,769 B2 | 5/2013 | Hatano et al. | |
| 8,456,586 B2 | 6/2013 | Matthew et al. | |
| 8,466,852 B2 | 6/2013 | Drzaic et al. | |
| 8,599,353 B2 | 12/2013 | Corrigan et al. | |
| 8,623,575 B2 | 1/2014 | Chen et al. | |
| 8,736,802 B2 | 5/2014 | Kajiya et al. | |
| 8,766,314 B2 | 7/2014 | Hatano et al. | |
| 8,766,858 B2 | 7/2014 | Li et al. | |
| 8,767,141 B2 | 7/2014 | Mathew et al. | |
| 8,767,142 B2* | 7/2014 | Toyoyama | G02F 1/1333 349/59 |
| 9,195,105 B2 | 11/2015 | Kajiya et al. | |
| 9,454,025 B2* | 9/2016 | Zhong | G02F 1/13306 |
| 9,997,578 B2* | 6/2018 | Zhong | G02F 1/13306 |
| 10,326,222 B2* | 6/2019 | Huang | G02F 1/1333 |
| 2001/0015788 A1 | 8/2001 | Mandai et al. | |
| 2002/0085158 A1 | 7/2002 | Armagost et al. | |
| 2003/0011298 A1 | 1/2003 | Palanisamy | |
| 2003/0117543 A1 | 6/2003 | Chang | |
| 2003/0206331 A1 | 11/2003 | Chung et al. | |
| 2004/0016568 A1 | 1/2004 | Palanisamy | |
| 2004/0245924 A1 | 12/2004 | Utsunomiya et al. | |
| 2004/0263947 A1 | 12/2004 | Drzaic et al. | |
| 2005/0072597 A1 | 4/2005 | Lee et al. | |
| 2006/0026521 A1 | 2/2006 | Hotelling et al. | |
| 2006/0125995 A1 | 6/2006 | Tai et al. | |
| 2006/0197753 A1 | 9/2006 | Hotelling | |
| 2007/0002009 A1 | 1/2007 | Pasch et al. | |
| 2007/0019147 A1 | 1/2007 | Ryu | |
| 2007/0035679 A1 | 2/2007 | Lee et al. | |
| 2007/0063939 A1 | 3/2007 | Bellamy | |
| 2007/0080360 A1 | 4/2007 | Mirsky et al. | |
| 2007/0148831 A1 | 6/2007 | Nagata et al. | |
| 2007/0273807 A1* | 11/2007 | Yun | G02F 1/13452 349/58 |
| 2008/0024060 A1 | 1/2008 | Jonnalagadda et al. | |
| 2008/0035929 A1 | 2/2008 | Chen et al. | |
| 2008/0042180 A1 | 2/2008 | Yamazaki et al. | |
| 2008/0049408 A1 | 2/2008 | Yamauchi et al. | |
| 2008/0117367 A1 | 5/2008 | Abe | |
| 2008/0143913 A1 | 6/2008 | Lee et al. | |
| 2009/0027896 A1 | 1/2009 | Nishimura et al. | |
| 2009/0114922 A1 | 5/2009 | Shiroguchi et al. | |
| 2009/0116203 A1 | 5/2009 | Matsuno et al. | |
| 2009/0122653 A1 | 5/2009 | Seki et al. | |
| 2009/0191670 A1 | 7/2009 | Heitzinger et al. | |
| 2009/0278452 A1 | 11/2009 | Kim | |
| 2009/0284688 A1 | 11/2009 | Shiraishi et al. | |
| 2010/0014016 A1* | 1/2010 | Chen | G02F 1/13452 349/58 |
| 2010/0097551 A1 | 4/2010 | Yamagishi et al. | |
| 2010/0148209 A1 | 6/2010 | Hatano et al. | |
| 2010/0265225 A1 | 10/2010 | Han et al. | |
| 2010/0315570 A1 | 12/2010 | Matthew et al. | |
| 2011/0012845 A1 | 1/2011 | Rothkopf et al. | |
| 2011/0109829 A1 | 5/2011 | Mathew et al. | |
| 2011/0176199 A1 | 7/2011 | Sakurai | |
| 2011/0186345 A1 | 8/2011 | Pakula et al. | |
| 2011/0194063 A1 | 8/2011 | Lee et al. | |
| 2011/0204403 A1 | 8/2011 | Kim et al. | |
| 2011/0292323 A1 | 12/2011 | Corrigan et al. | |
| 2011/0317120 A1 | 12/2011 | Kajiya et al. | |
| 2012/0009973 A1 | 1/2012 | Demuynck et al. | |
| 2012/0218502 A1 | 8/2012 | Seki et al. | |
| 2012/0235969 A1 | 9/2012 | Burns et al. | |
| 2012/0242592 A1 | 9/2012 | Rothkopf et al. | |
| 2012/0273834 A1 | 11/2012 | Hatano et al. | |
| 2012/0287386 A1 | 11/2012 | Kajiya et al. | |
| 2012/0319304 A1 | 12/2012 | Pressel et al. | |
| 2012/0320319 A1 | 12/2012 | Chen et al. | |
| 2013/0002685 A1 | 1/2013 | Shenoy et al. | |
| 2013/0082984 A1 | 4/2013 | Drzaic et al. | |
| 2013/0088671 A1 | 4/2013 | Drzaic et al. | |
| 2013/0094126 A1 | 4/2013 | Rappoport et al. | |
| 2013/0141664 A1* | 6/2013 | Toyoyama | G02F 1/1333 349/59 |
| 2013/0228785 A1 | 9/2013 | Hatano et al. | |
| 2013/0328051 A1 | 12/2013 | Franklin et al. | |
| 2013/0342099 A1 | 12/2013 | Weber et al. | |
| 2014/0049522 A1 | 2/2014 | Mathew et al. | |
| 2014/0063393 A1* | 3/2014 | Zhong | G02F 1/13306 349/42 |
| 2014/0138733 A1 | 5/2014 | Hatano et al. | |
| 2014/0254094 A1 | 9/2014 | Chang et al. | |
| 2014/0293210 A1 | 10/2014 | Kajiya et al. | |
| 2016/0202587 A1 | 7/2016 | Jung et al. | |
| 2016/0216814 A1 | 7/2016 | Begic et al. | |
| 2017/0012095 A1* | 1/2017 | Zhong | G02F 1/13306 |

(56) References Cited

U.S. PATENT DOCUMENTS

| | | | |
|---|---|---|---|
| 2017/0076687 A1 | 3/2017 | Lou et al. | |
| 2017/0077147 A1 | 3/2017 | Kwon et al. | |
| 2017/0168463 A1 | 6/2017 | Hong et al. | |
| 2018/0090860 A1* | 3/2018 | Huang | G02F 1/1333 |
| 2019/0212603 A1* | 7/2019 | Drzaic | G02F 1/13452 |

FOREIGN PATENT DOCUMENTS

| | | |
|---|---|---|
| CN | 101636689 | 1/2010 |
| CN | 102187272 | 9/2011 |
| EP | 0474508 | 3/1992 |
| EP | 2138892 | 12/2009 |
| EP | 2141573 | 6/2010 |
| EP | 2418537 | 2/2012 |
| JP | H05-142556 A | 6/1993 |
| JP | 10261854 | 9/1998 |
| JP | 2000163031 | 6/2000 |
| JP | 2001092381 | 4/2001 |
| JP | 2001215528 | 8/2001 |
| JP | 2002040472 | 2/2002 |
| JP | 200293851 | 3/2002 |
| JP | 2002116454 | 4/2002 |
| JP | 2002-341785 A | 11/2002 |
| JP | 2002342033 | 11/2002 |
| JP | 2003058074 | 2/2003 |
| JP | 2003255850 | 9/2003 |
| JP | 2003337353 | 11/2003 |
| JP | 3593975 | 11/2004 |
| JP | 200549685 | 2/2005 |
| JP | 2007220569 | 8/2007 |
| JP | 2008033094 | 2/2008 |
| JP | 2009-098451 A | 5/2009 |
| JP | 2009-229754 A | 10/2009 |
| JP | 2009244338 | 10/2009 |
| JP | 2010-039211 A | 2/2010 |
| JP | 2011042531 | 3/2011 |
| KR | 10-2005-0093595 | 9/2005 |
| KR | 10-2010-005021 | 1/2010 |
| KR | 10-2011-0059629 | 6/2011 |
| KR | 10-2012-0020088 | 3/2012 |
| TW | 200521587 | 7/2005 |
| TW | I297095 B | 5/2008 |
| TW | 200839356 | 10/2008 |
| TW | 201001624 | 1/2010 |
| WO | 2006106365 | 10/2006 |
| WO | 2008/114404 A | 9/2008 |
| WO | 2009089105 | 7/2009 |

OTHER PUBLICATIONS

JPO (apparently) Notification of Reason(s) for Rejection for Application No. 2014-534592 dated Feb. 3, 2016 (10 pp. original and English translation), provided by Applicant.

Martisauskas et al, U.S. Appl. No. 13/229,120 filed Sep. 9, 2011.

Wright et al, U.S. Appl. No. 13/284,096, filed Oct. 28, 2011.

Zhong et al., U.S. Appl. No. 13/600,862, filed Aug. 31, 2012.

* cited by examiner

DISPLAYS WITH MINIMIZED BORDER REGIONS HAVING AN APERTURED TFT OR OTHER LAYER FOR SIGNAL CONDUCTORS

This application is a continuation of patent application Ser. No. 13/253,844, filed Oct. 5, 2011, which is hereby incorporated by reference herein in its entirety. This application claims the benefit of and claims priority to patent application Ser. No. 13/253,844, filed Oct. 5, 2011.

BACKGROUND

This relates generally to electronic devices and, more particularly, to displays for electronic devices.

Electronic devices such as cellular telephones, computers, and media players are often provided with displays for displaying images to a user. Displays generally include multiple layers. For example, a display may include a layer of liquid crystal material sandwiched between two layers of glass. Other types of displays such as flexible displays may contain a layer of light-emitting material such as organic light-emitting diodes (OLEDs) formed on a layer of flexible material. A display may also include a display circuitry layer such as a thin-film transistor (TFT) layer that may be used to control the emission of light in the display.

A flexible printed circuit ("flex circuit") is often mounted to the TFT layer in order to electrically connect the display circuitry to internal components within the electronic device. A conductive adhesive is often used to mount the flexible circuit board to the TFT layer.

Conductive structures within a display and conductive structures connected to the display do not emit light and may therefore be located in the inactive region of a display. Additional border area may be required for mounting a flex circuit to the TFT layer. Conductive structures in the display border region and flex circuits attached to the display border region may therefore reduce the amount of active display area that is available to display images and may create aesthetically unappealing border regions around the periphery of the display.

It would therefore be desirable to provide improved displays for electronic devices.

SUMMARY

A display may be provided for an electronic device such as a portable electronic device. A display may have an inner portion of active display area surrounded by a peripheral border of inactive display area.

A display may have a thin-film transistor (TFT) layer that contains display circuitry for operating the display. A display may be provided with one or more openings formed in the TFT layer in order to allow conductive bridges to pass through layers of the display. Conductive bridges may be formed from wire bonds or other conductive materials that pass through the openings in the thin-film transistor layer connecting the display circuitry with other device circuitry.

Wire bonds may form conductive bridges that pass down through the openings in the TFT layer. Wire bonds that pass through the openings may have one end coupled to an electrical contact on the surface of the TFT layer and another end coupled to an electrical contact on the surface of other device circuitry.

Potting may be formed over the wire bonds to improve the reliability of the wire bonds.

Openings in the TFT layer may be filled with a conductive material. The conductive material may have a portion that is electrically coupled to an electrical contact associated with the TFT layer and another portion that is electrically coupled to an electrical contact associated with other device circuitry. One or more wire bonds or flex circuits may be used to electrically connect the display circuitry with the conductive material in the opening.

Further features of the invention, its nature and various advantages will be more apparent from the accompanying drawings and the following detailed description of the preferred embodiments.

DETAILED DESCRIPTION

An electronic device may be provided with a display. Displays may be used to display visual information such as text and images to users.

Figure 1:
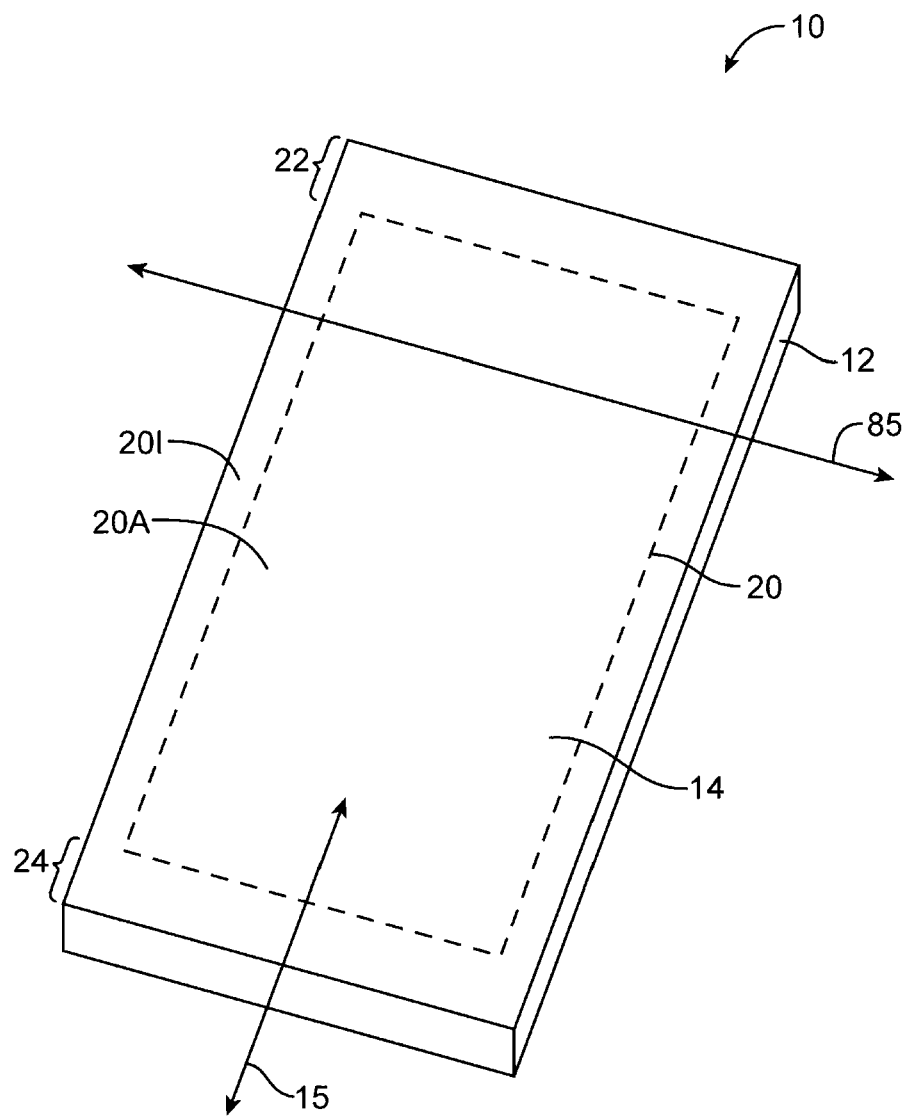
FIG. 1 is a perspective view of an illustrative electronic device such as a handheld electronic device with a display in accordance with an embodiment of the present invention.

An illustrative electronic device of the type that may be provided with a display is shown in FIG. 1. Electronic device 10 may be a portable electronic device or other suitable electronic device. For example, electronic device 10 may be a laptop computer, a tablet computer, a somewhat smaller device such as a wrist-watch device, pendant device, or other wearable or miniature device, a cellular telephone, media player, electronic book, etc. The electronic device might be a larger device as well, such as a television or digital sign.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may have a display such as display 14. Display 14 may be rigid or flexible or may have a combination of rigid and flexible layers. For example, a flexible display may include an array of organic light-emitting diodes (OLEDs) formed on a flexible substrate. For the purpose of this invention, organic light-emitting diode displays are intended to encompass all types of light-emitting displays that comprise thin organic film layers, including displays comprising organic small molecules, polymers, dendrimers, and quantum dots. The thin film layers within the organic light-emitting display may comprise a cathode layer, an anode layer, one or more emissive layers, one or more hole transport layers, one or more electronic transport layers, capping layers, hole injection layers, electron injection layers, exciton blocking layers, and blends and composites of these materials. Other types of flexible display technologies may be used to form a flexible display (e.g., electronic ink displays, electronic paper displays, etc.).

As another example, a liquid crystal display (LCD) may include a layer of liquid crystal material sandwiched between two rigid substrates. In general, display 14 may be based on any suitable display technology (liquid crystals, light-emitting diodes, organic light-emitting diodes, plasma cells, electronic ink arrays, electronic paper displays, flexible liquid crystal displays, flexible electrochromic displays, flexible electrowetting displays, etc.).

In some configurations, portions of display 14 such as peripheral regions 20I may be inactive and portions of display 14 such as rectangular central portion 20A (bounded by dashed line 20) may correspond to the active part of display 14. In active display region 20A, an array of image pixels may be used to present text and images to a user of device 10. In active region 20A, display 14 may include touch sensitive components for input and interaction with a user of device 10. If desired, regions such as regions 20I and 20A in FIG. 1 may both be provided with display pixels (e.g., all or substantially all of the entire front planar surface of a device such as device 10 may be covered with display pixels).

The width of peripheral regions 20I (sometimes referred to as the "peripheral border") may be dictated by the amount of space needed within the display on which to form display circuitry or on which to mount connecting structures that connect the display components to other device components. It may be desirable to minimize the width of peripheral regions 20I in order to increase the active region of the display and to create a more aesthetically appealing device.

Display 14 may be provided with openings in a display circuitry layer such as a thin-film transistor layer that allow electrical connections with other device components to pass through the openings. Forming electrical connections that pass through openings in a display layer may help reduce the amount of circuitry formed in peripheral regions 20I of display 14 thereby reducing the required width of peripheral regions 20I. Electrical connections that pass through openings in a display layer may include wire bonds or other conductive bridges through the openings.

It may be aesthetically unappealing to have asymmetric border regions in the display of an electronic device such as device 10. Circuitry that increases the width of peripheral border 20I on one side of display 14 may therefore be matched by additional unused peripheral border 20I on another side of display 14 to preserve display symmetry. Reducing the width of peripheral region 20I on one side of display 14 (e.g., bottom portion 24, sometimes referred to as the "bottom border") may therefore reduce the width of peripheral regions 20I on another side of display (e.g., top portion 22).

Figure 2:
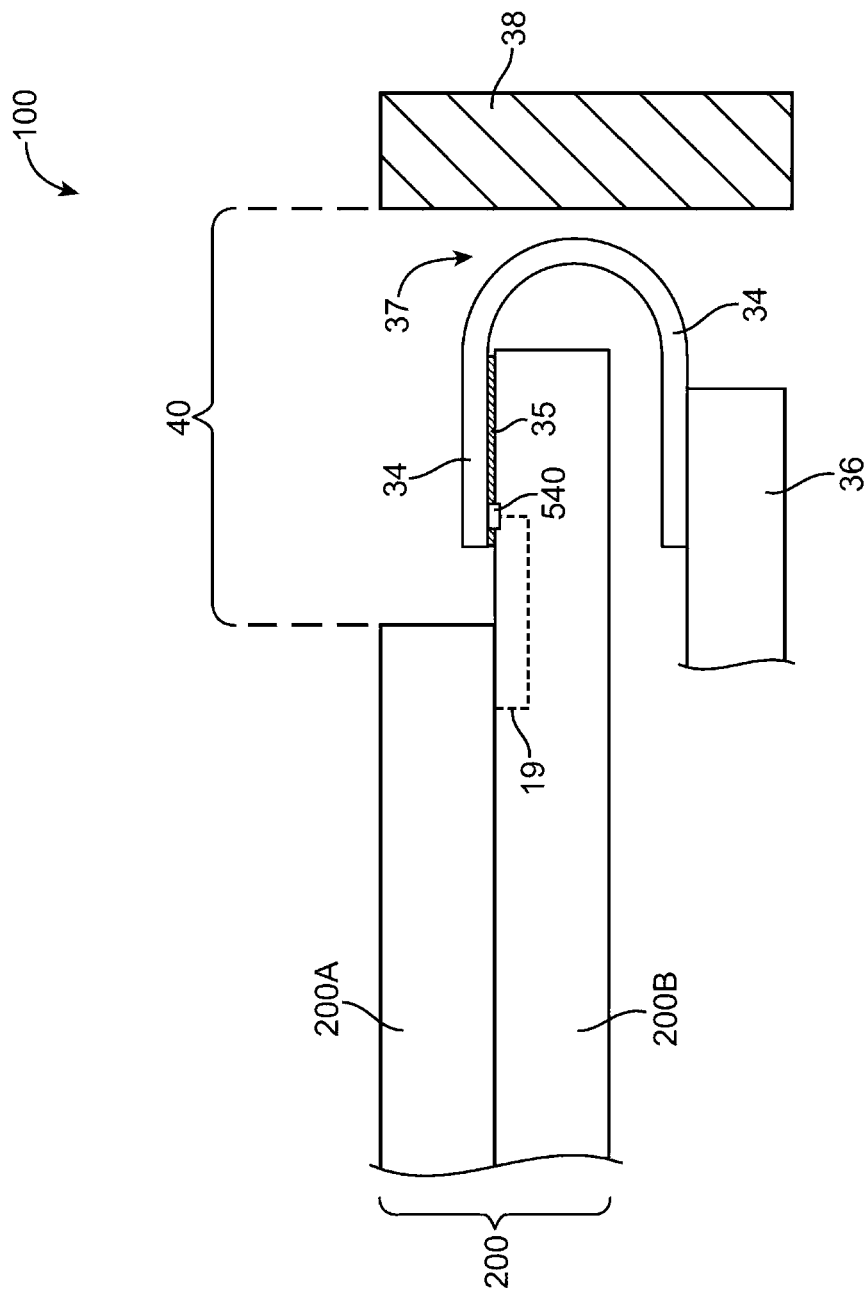
FIG. 2 is a cross-sectional side view of a conventional electronic device having display circuitry arrangements that result in undesirably large inactive display areas around the border of a display.

A cross-sectional side view of a conventional electronic device in the vicinity of a bottom border of a display is shown in FIG. 2. Device 100 includes display 200 and enclosure 38. Display 200 contains color filter layer 200A and TFT layer 200B.

A flexible circuit is often used to electrically connect display circuitry with other circuitry within the device. Anisotropic conductive film 35 is used to mount one end of flex circuit 34 to the upper surface of TFT layer 200B. Conductive adhesive 35 forms an electrical connection between flex circuit 34 and contact pad 540. Contact pad 540 is typically connected to one or more traces in the TFT layer such as trace 19.

In a typical arrangement, flex circuit 34 wraps around one end of TFT layer 200B by passing through gap 37 between TFT layer 200B and enclosure 38 and then curving back under TFT layer 200B. The end of flex circuit 34 that is not connected to the TFT layer is connected with printed circuit board 36.

Flex circuit 34 and other circuitry on TFT layer 200B does not emit light and may therefore create an inactive display region such as inactive border 40. Inactive border 40 includes both the space needed on layer 200B to mount flex circuit 34 as well as the width of gap 37 between TFT layer 200B and enclosure 38 that is required to allow flex circuit 34 to wrap around the end of TFT layer 200B.

Figure 3:
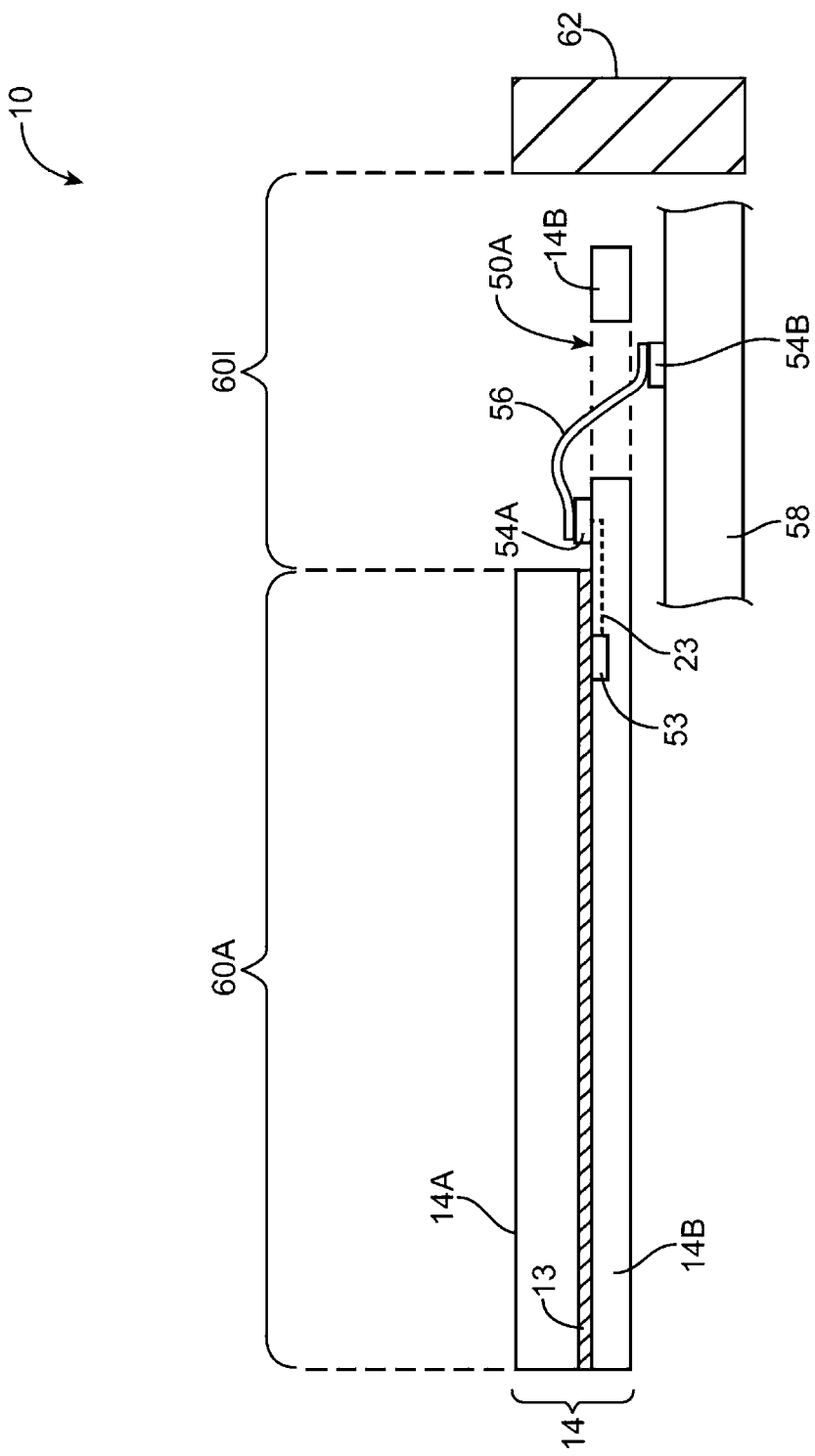
FIG. 3 is a cross-sectional side view of a portion of an illustrative electronic device having conductive bridges that pass through holes in the thin-film transistor layer of a display in accordance with an embodiment of the present invention.

The inactive portion of a display may be minimized by reducing the amount of space needed for display circuitry and by reducing the gap between the display and the enclosure. FIG. 3 is a cross-sectional side view (i.e., a cross-section taken along axis 15 of FIG. 1) of an electronic device of the type shown in FIG. 1 illustrating how the inactive bottom border of a display may be minimized by providing openings in a display layer that allow conductive bridges through the openings.

As shown in FIG. 3, device 10 may include a display such as display 14. Display 14 may have multiple layers such as display layer 14A and thin-film transistor (TFT) layer 14B. Display layer 14A may be a color filter layer that includes an array of colored filter elements. A layer of liquid crystal material such as liquid crystal layer 13 may be interposed between color filter layer 14A and TFT layer 14B. This is merely illustrative. If desired, display 14 may be an organic light-emitting diode display that does not include a color filter layer or a liquid crystal layer. As another example, display 14 may be an organic light-emitting diode display that includes a color filter layer or other color changing material. Display 14 may, in general, be based on any suitable display technology (liquid crystals, organic light-emitting diodes, plasma cells, electronic ink arrays, flexible liquid crystal displays, electrochromic displays, electrowetting displays, etc.). Display 14 may be comprised of one or more glass substrates or substrates that include polymers or metal films. If desired, display 14 may be a flexible display. Examples that use liquid crystal technology are sometimes described herein as an example.

TFT layer 14B may include circuitry for operating display 14 such as display driver circuitry and thin-film transistors. If desired, TFT layer 14B may be a thin plastic film formed from polyimide, Polyethylene naphthalate (PEN), Polyethylene terephthalate (PET), other suitable polymers, a combination of these polymers, etc. Other suitable substrates that may be used to form TFT layer 14B include glass, metal foil covered with a dielectric, a multi-layer polymer stack, a thin glass film bonded to a thin polymer, a polymer composite film comprising a polymer material combined with nano-particles or microparticles dispersed therein, etc. For example, a layer of polyimide may be used to form the substrate for TFT layer 14B. TFT layer 14B may have a thickness of 10-25 microns, 25-50 microns, 50-75 microns, 75-100 microns, 100-125 microns, 125-150 microns, or more than 150 microns. In one particular example, TFT layer 14B may be 100 microns thick.

Other layers or sublayers that may be included in display 14 include a touch-sensitive layer (e.g., a sheet of polymer with an array of transparent capacitor electrodes for a capacitive touch sensor), optical layers such as polarizing layers, shielding layers (e.g., for shielding unwanted electric fields), heat sinking layers (e.g., for conducting heat away from the display), sealing layers (e.g., layers of sealant formed from thin films, polymers, inorganic materials, metal foils, composites, etc.), cover layers (e.g., a layer of cover glass), other suitable display layers, or a combination of these display layers.

TFT layer 14B may include display circuitry such as display circuitry 53 for operating display 14. Display circuitry 53 may include display image pixel structures such as display electrodes and display circuitry for controlling the display electrodes. Display circuitry 53 may form a portion of an array of thin-film transistors (TFTs) that corresponds with an array of display image pixels. Display circuitry 53 may include touch sensor electrodes, transistors (e.g., polycrystalline silicon transistors, amorphous silicon transistors, organic thin-film transistors, metal oxide transistors, carbon nanotube or graphene transistors, other nanoparticle-based transistors, etc.), interconnect lines associated with a thin-film transistor array or other image pixel array, integrated circuits, driver integrated circuits, other conductive structures, or a combination of these conductive structures.

Circuitry 53 in TFT layer 14B may be interconnected using traces such as conductive trace 23. Conductive traces such as trace 23 may be coupled to one or more contact pads such as contact pad 54A. It may be desirable to connect display circuitry to other circuitry in the device (e.g., a main logic board or other printed circuit). One or more conductive paths such as conductive bridge 56 may be used to form an electrical connection between traces such as trace 23 and other circuitry within the device such as printed circuit substrate 58. As shown in FIG. 3, conductive bridge 56 may pass through an opening in the display such as opening 50A in TFT layer 14B.

Printed circuit 58 and other printed circuits in device 10 may be formed from rigid printed circuit board material (e.g., fiberglass-filled epoxy), flexible sheets of material such as polymers, or a combination of rigid and flexible materials (sometimes referred to as "rigid-flex" printed circuit boards). Flexible printed circuits ("flex circuits") may, for example, be formed from flexible sheets of polyimide.

Conductive paths such as conductive bridges 56 that connect display circuitry with other circuitry in electronic device 10 may have one end that bonds with a contact on the surface of the TFT layer and another end that bonds with a contact on the surface of a printed circuit within the device. In the example shown in FIG. 3, conductive bridge 56 may have one end that bonds with contact pad 54A (on the surface of TFT layer 14B) and another end that bonds with contact pad 54B (on the surface of printed circuit 58).

Conductive bridge 56 may be formed from aluminum, copper, gold, other metals, other suitable conductive materials, a combination or composite of conductive materials, etc. Portions of conductive bridge 56 may include flex circuitry formed from flexible sheets of material such as polymers. Conductive bridge 56 may, in general, be formed using any suitable connector or mounting technology. In the example of FIG. 3, conductive bridge 56 is formed using one or more wire bonds that pass through openings in the display such as opening 50A in TFT layer 14B. Wire bond 56 electrically couples bond pad 54A of TFT layer 14B with bond pad 54B of printed circuit 58. This is merely illustrative. Conductive bridge 56 may be formed from other types of conductive connectors. Wire bonding to form conductive bridges 56, as shown in FIG. 3, is sometimes described herein as an example.

Wire bonds 56 may be formed from wedge bonding, ribbon wedge bonding (e.g., to create a flat ribbon wire), ball bonding, other suitable wire bonding methods, etc. The welding process used to form wire bonds 56 may be facilitated with ultrasonic energy, thermal energy, pressure, or a combination of these forms of energy. Wire bonds 56 may have a diameter of 5-15 microns, 15-25 microns, 25-35 microns, 35-50 microns, or more than 50 microns. For illustrative purposes, the wires used for bonding may have a diameter of 25 microns, defining the minimum size of the contacting area. Alternatively, wires of 32 micron diameter may be used. Materials that may be used in forming wire bonds 56 include Tungsten Carbide, Titanium Carbide, composite materials (e.g., a composite material formed from ceramic and metal), other suitable materials, combinations of these materials, etc.

One or more openings such as opening 50A (sometimes referred to as a hole) may be formed in TFT layer 14B in order to allow conductive bridges such as conductive bridge 56 (sometimes referred to as a wire bond) to pass through TFT layer 14B and couple to other device circuitry that is adjacent to the lower surface of TFT layer 14B such as printed circuit 58 underneath display 14. Openings 50A may be designed to facilitate a wire bonding process that uses a bonding tool to attach wire bond 56 to bond pads 54A and 54B (sometimes referred to as landing pads). Openings 50A may provide enough clearance around the edges of bond pad 54B to allow the tool to connect to bond pad 54B. Bond pads may be spaced sufficiently far apart to avoid shorting leads. Openings in the TFT layer such as opening 50A may be formed using any suitable method (e.g., mechanical-drilling, laser-drilling, inserting a hot element, etc.) and may have any suitable shape (circular, rectilinear, other suitable shape, etc.).

Display 14 may be enclosed on one or more ends by an enclosure such as enclosure 62. Enclosure 62 may be formed from part or all of one or more structures in device 10. For example, enclosure 62 may be formed from part of device housing 12. Providing openings 50A in TFT layer 14B that allow conductive bridges 56 to pass through TFT layer 14B may allow a gap between TFT layer 14B and enclosure 62 to be smaller than gaps between displays and device housings in conventional devices. Providing openings 50A in TFT layer 14B that allow conductive bridges 56 to pass through TFT layer 14B may reduce the border regions around display 14 required for mounting connecting structures. Reducing the space needed in these areas may minimize the overall width of display border 60I (e.g., a bottom border of display 14), allowing for active display area such as active display region 60A to extend closer to the edge of device 10 than in conventional devices.

Figure 4:
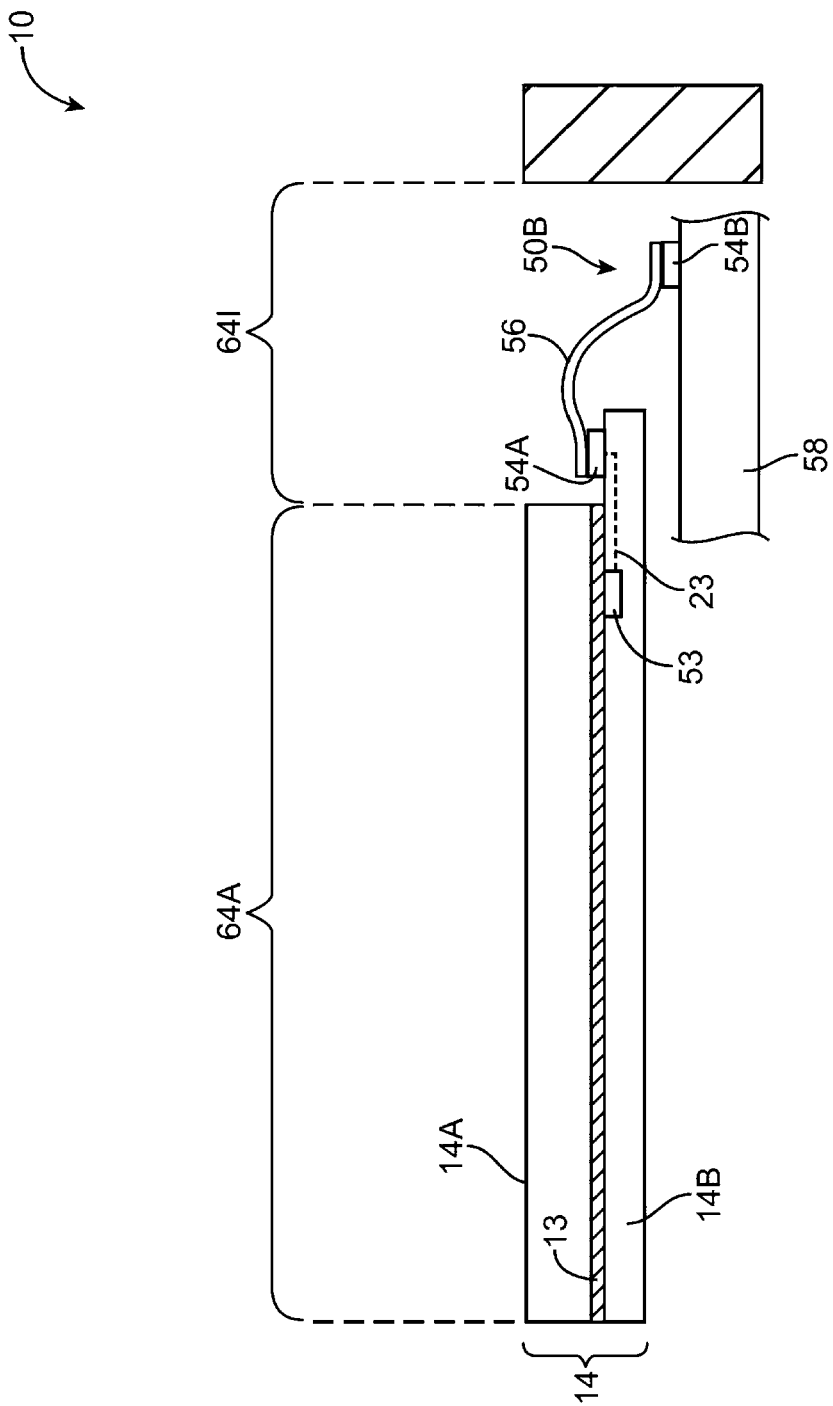
FIG. 4 is a cross-sectional side view of a portion of an illustrative electronic device having wire bonds that pass through a gap between the display and an enclosure in accordance with an embodiment of the present invention.

FIG. 4 is a cross-sectional side view of a portion of device 10 illustrating another example of how the inactive portion of a display may be minimized. In this example, conductive bridges may couple display circuitry with other device circuitry by passing through the gap between the display and the display enclosure. As shown in FIG. 4, a gap such as gap 50B may be formed between TFT layer 14B and enclosure 62. Conductive bridges such as wire bond 56 may pass through opening 50B to couple to circuitry underneath the display such as printed circuit 58.

Conductive bridge 56 may be a wire, a flat ribbon, a bundle of wires, or a bundle of flat ribbons formed using the method of wire bonding. Using a wire bond such as wire bond 56 to couple display circuitry with other device circuitry may allow a gap between TFT layer 14B and enclosure 62 to be smaller than gaps between displays and device housings in conventional devices. Wire bond 56 may also reduce the peripheral area around display 14 required for mounting connecting circuitry. Reducing the space needed in these areas may minimize the overall width of display border 64I (e.g., a bottom border of display 14), allowing for active display area such as active display region 64A to extend closer to the edge of device 10 than in conventional devices.

Figure 5:
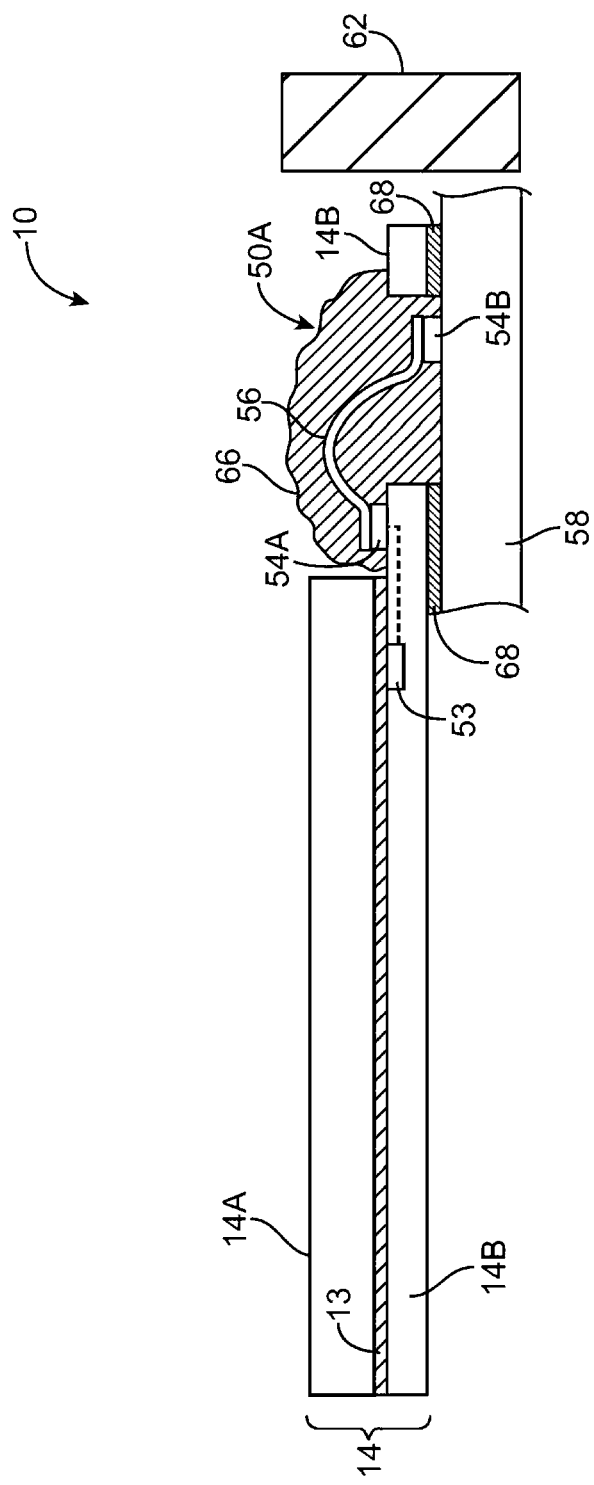
FIG. 5 is a cross-sectional side view of a portion of an illustrative electronic device having potting that is used to improve the reliability of wire bonds in accordance with an embodiment of the present invention.

It may be desirable to cover or encapsulate conductive bridge 56. FIG. 5 is a cross-sectional side view of a portion of device 10 illustrating how potting may be used to encapsulate wire bond 56. After forming wire bond 56, an encapsulant such as potting material 66 may be used to fill opening 50A and surround wire bond 56. Potting material 66 may also surround the junction between wire bond 56 and contact pad 54A, as well as the junction between wire bond 56 and contact pad 54B. Examples of materials that may be used in forming potting 66 include epoxy, silicone, urethane, acrylic, polyester, other types of potting material, a combination of these potting materials, etc.

Potting or encapsulating conductive bridge 56 may provide several benefits to both the conductive path itself and the electronic device. For example, in some configurations TFT layer 14B may be formed from glass. A glass surface with multiple holes in it such as hole 50A may be prone to failure if exposed to excess pressure or force. Filling openings in TFT layer 14B such as opening 50A with potting material may increase the resiliency of the display around the openings. Other benefits of using potting material 66 may include protection against moisture, contaminants, and corrosion, electrical insulation, heat dissipation, and other benefits. Potting material 66 may also help divert unwanted pressure away from the display and improve the reliability and robustness of wire bonds 56.

Other features may optionally be added to improve the resiliency of the display and the reliability of conductive bridges 56. For example, a layer of adhesive such as adhesive 68 may be formed between TFT layer 14B and printed circuit 58. If desired, adhesive 68 may surround openings in TFT layer 14B such as opening 50A. Adhesive 68 may be configured to attach printed circuit substrate 58 to the underside of TFT layer 14B. Adhesive 68 may increase the robustness of the display around these openings and may also provide protection against moisture, contaminants, and corrosion. Adhesive 68 may be formed from pressure sensitive adhesive (PSA), epoxy, or other suitable adhesives.

Figure 6:
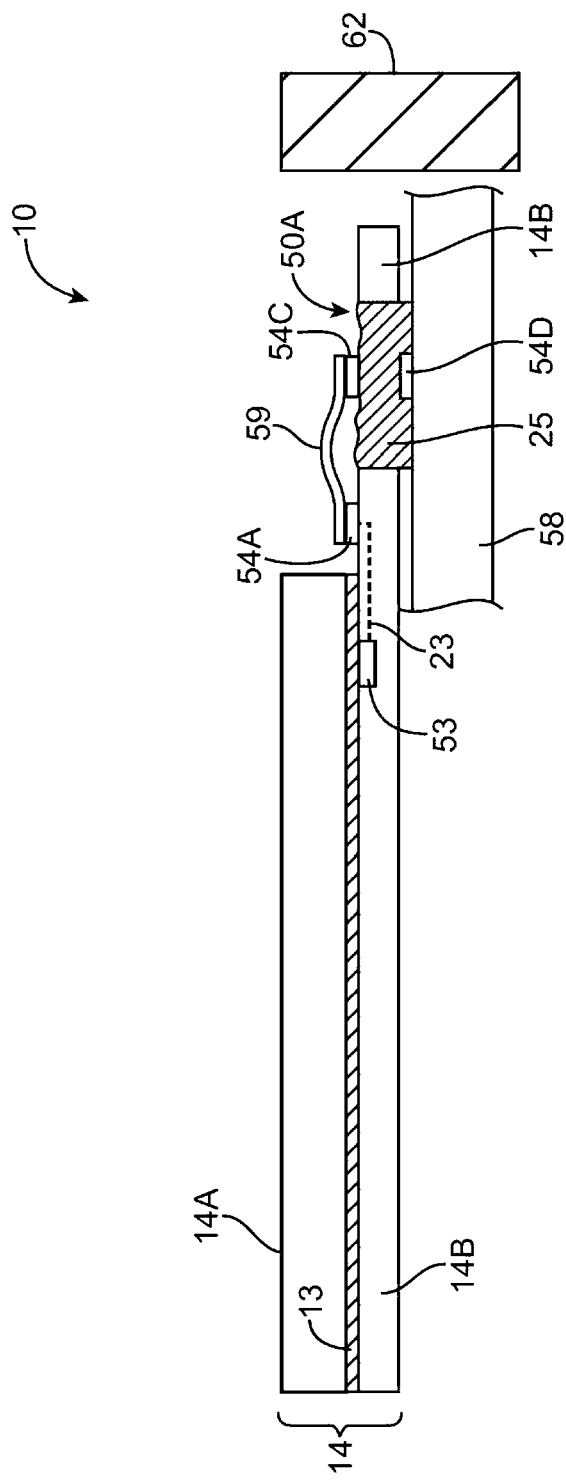
FIG. 6 is a cross-sectional side view of a portion of an illustrative electronic device having openings in the thin-film transistor layer of a display that are filled with a conductive material coupled to wire bonds in accordance with an embodiment of the present invention.

The space-saving benefits of using one or more holes in the TFT layer for connections between display circuitry and other device circuitry may be obtained with other configurations. One example of an alternative configuration is shown in FIG. 6. In this example, opening 50A is filled with a conductive material, such as conductive material 25. Conductive material 25 may be formed from conductive paste, conductive adhesive, conductive foam, or other suitable conductive material. An electrical contact such as contact pad 54C may be situated over opening 50A on the surface of conductive material 25. Contact pad 54C may be a separate component from conductive material 25 or may be formed from an integrated portion of conductive material 25. An additional electrical contact such as contact pad 54D may be situated under opening 50A on the surface of other device circuitry such as printed circuit substrate 58. Conductive material 25 may form an electrical connection between electrical contacts 54C and 54D.

Conductive bridges such as wire bond 59 may be used to connect bond pad 54A with conductive material 25. Wire bond 59 may have one end that bonds with contact pad 54A (on the surface of TFT layer 14B) and another end that bonds with contact pad 54C (on the surface of conductive material 25). Signals may travel from display circuitry 53 to other device circuitry 58 via wire bond 59 and conductive material 25.

Figure 7:
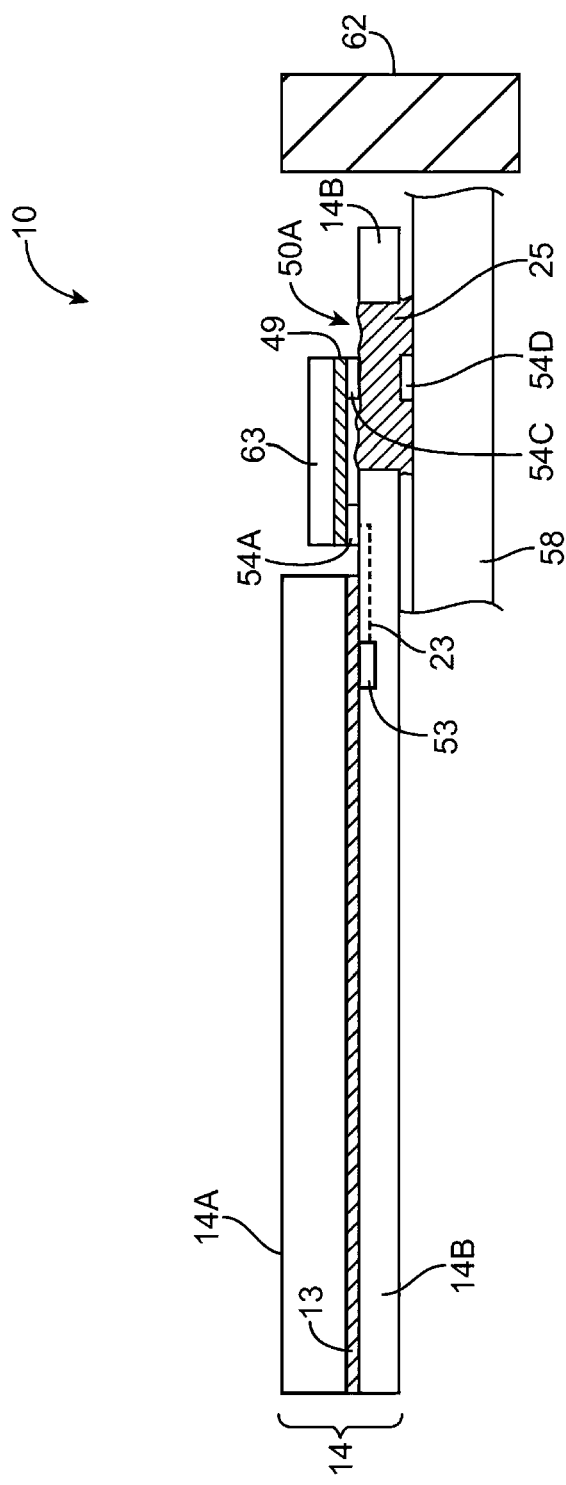
FIG. 7 is a cross-sectional side view of a portion of illustrative electronic device having openings in the thin-film transistor layer of a display that are filled with a conductive material coupled to a flex circuit in accordance with an embodiment of the present invention.

If desired, other materials may be used to connect bond pad 54A with conductive material 25 inside opening 50A. For example, as shown in FIG. 7, a layer of conductive adhesive such as conductive adhesive 49 may be used to mount a portion of a flexible circuit such as flex circuit 63 over electrical contacts 54A and 54C. Conductive adhesive 49 may be formed from anisotropic conductive film (ACF) or other suitable conductive adhesive. Signals may travel from display circuitry 53 to other device circuitry 58 via flex circuit 63 and conductive material 25.

Forming conductive bridges (e.g., wire bonds, conductive pastes, etc.) through holes in the TFT layer may provide a robust electrical bridge between display circuitry and other device circuitry while minimizing inactive display border regions.

Figure 8:
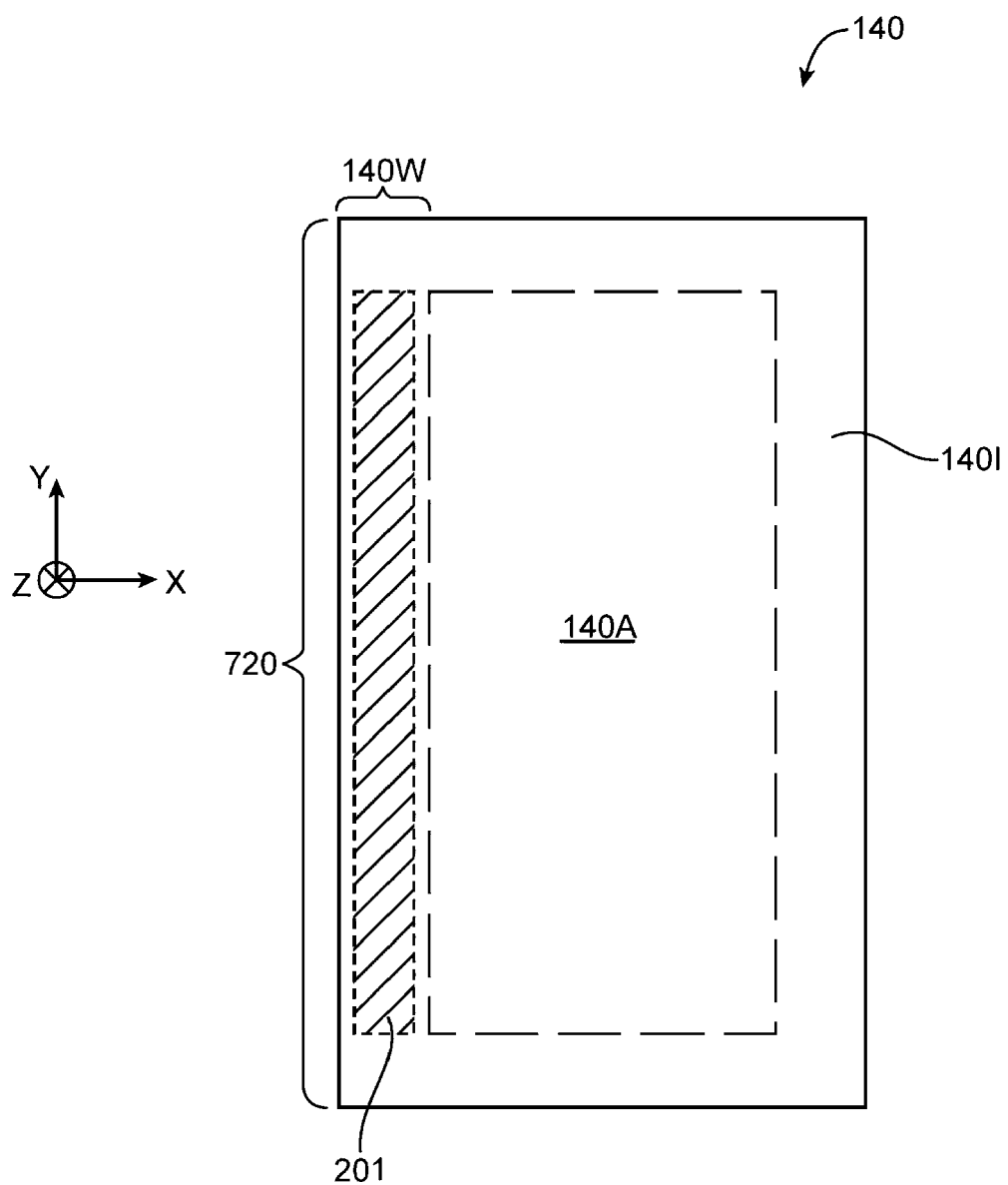
FIG. 8 is a top view of a conventional display having a display circuitry arrangement that results in undesirably large inactive display areas around the border of a display.

It may be desirable to reduce the width of inactive display area around the entire periphery of a display. In a conventional display such as display 140 shown in FIG. 8, width 140W of inactive display border 140I is typically dictated by display driver circuitry located in border region 201. Each row and column in a pixel array may have an associated conductive trace (sometimes referred to as an interconnect, driver line, or control line). Typically, these traces will run alongside each other in a common plane, parallel to side border 720 (i.e., parallel to the y-axis shown in FIG. 8). This method requires an added amount of width in region 201 of inactive display border 140I for each trace coming out of active display region 140A. Since each row and column of a pixel array may have a control line associated with it, each added row or column of pixels in a conventional display may increase the width (such as width 140W) of inactive display border 140I.

Figure 9:
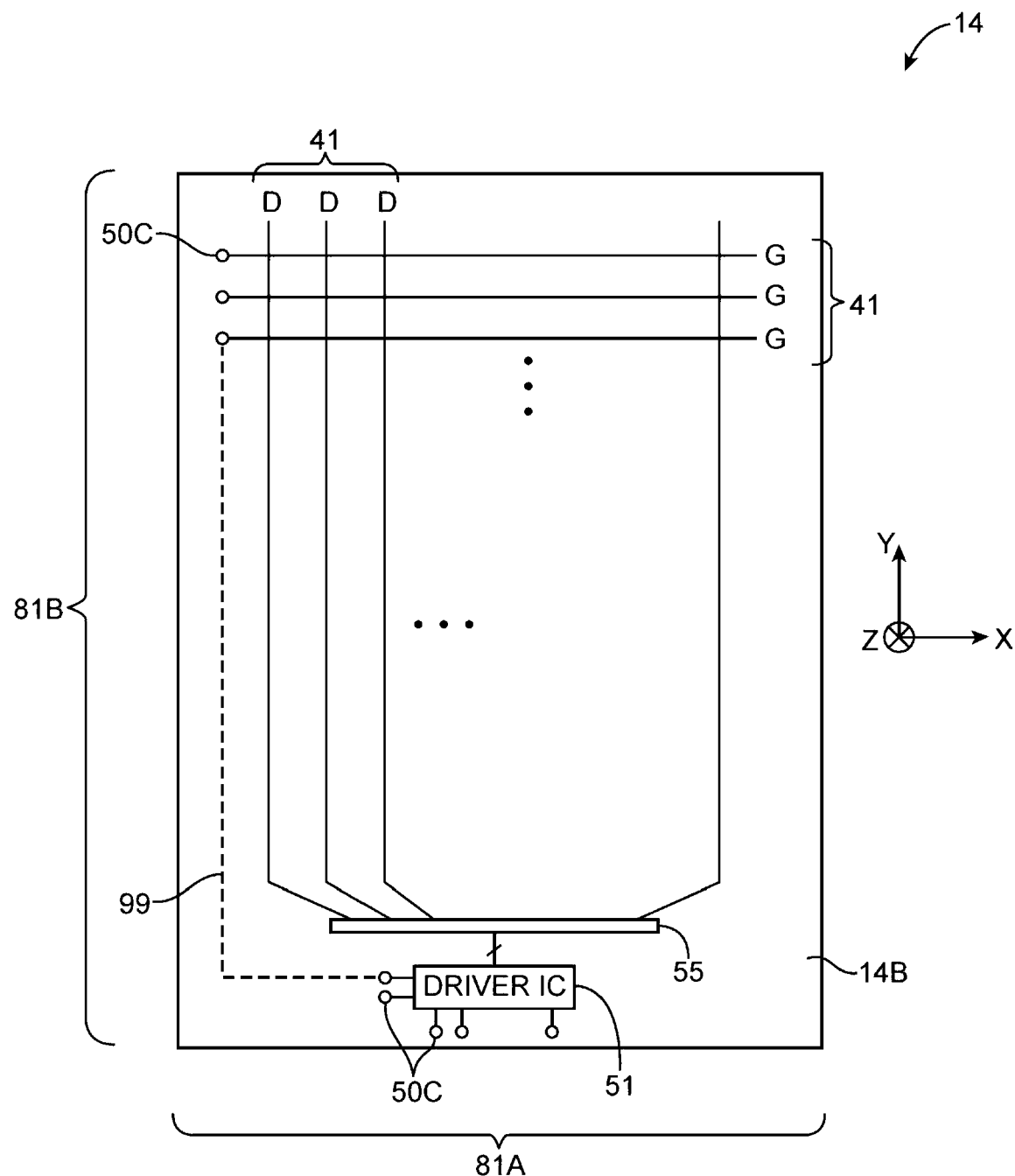
FIG. 9 is a top view of an illustrative display having holes formed in the thin-film transistor layer in accordance with an embodiment of the present invention.

FIG. 9 is a top view of display 14 illustrating how the width of inactive display borders may be reduced by routing display control lines through openings in a TFT layer. As shown in FIG. 9, display 14 may contain display circuitry such as driver integrated circuit 51 driver circuitry 55. Driver integrated circuit 51 and driver circuitry 55 may be used to drive signals to an array of pixels in display 14. Signal lines such as signal lines 99 may be used to distribute signals from the display driver circuitry to control lines such as control lines 41. As shown in FIG. 9, control lines 41 may include data lines (D) and gate lines (G).

A plurality of holes such as holes 50C may be formed in one or more layers of display 14 such as TFT layer 14B. Signal lines 99 may pass through holes 50C in display 14 (parallel with the z-axis as marked in FIG. 9) to run along a back side of the display. If desired, signal lines 99 coming from driver integrated circuit 51 may pass down through holes 50C (in region 81A) to a printed circuit adjacent to the back side of display 14 and may pass up through holes 50C (in region 81B) to reach control lines 41. This may reduce the need for space in the border region for display circuitry.

Figure 10:
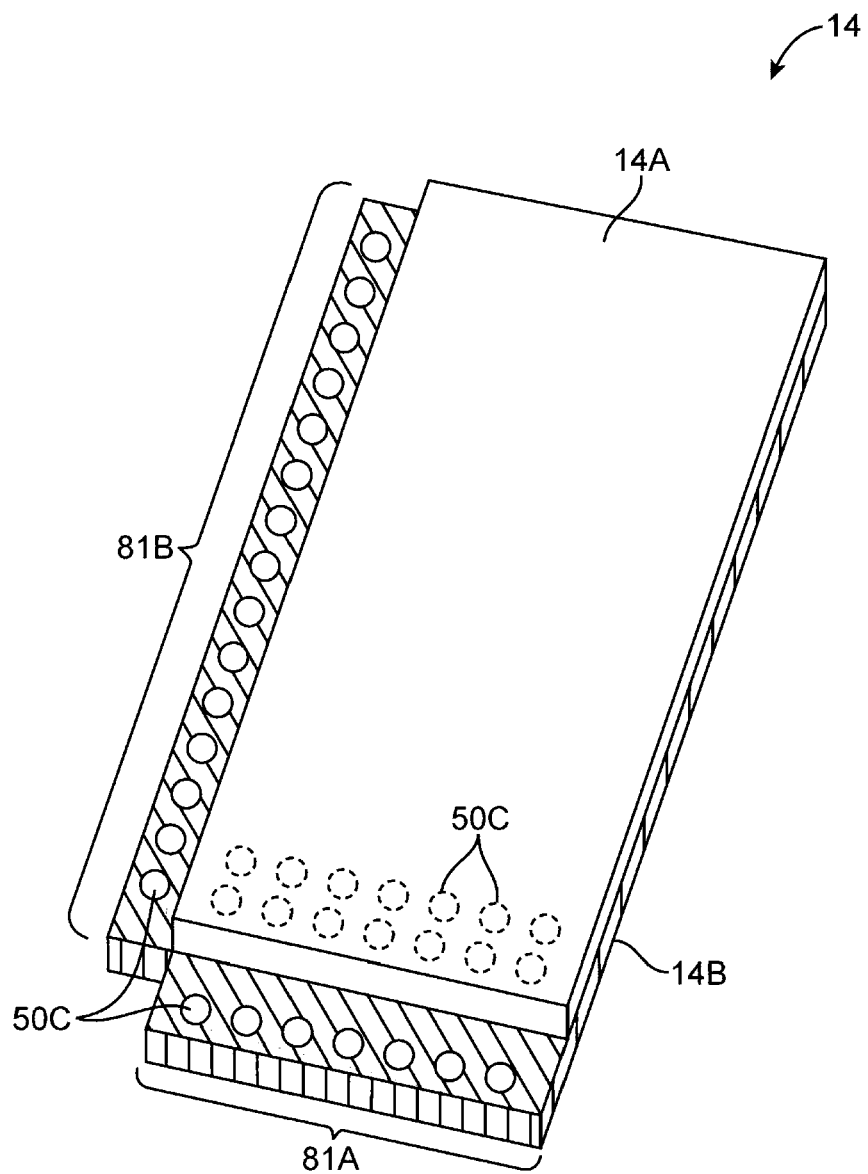
FIG. 10 is a perspective view of an illustrative display having round holes formed throughout the thin-film transistor layer in accordance with an embodiment of the present invention.

As shown in FIG. 10, a plurality of holes such as holes 50C may be formed throughout TFT layer 14B. If desired, holes such as holes 50C may be formed on one side, on two sides, on three sides, or on all four sides of display 14. Holes 50C may be located in regions of TFT layer 14B that protrude out from under display layer 14A such as regions 81A and 81B. Holes 50C may also be located in regions of TFT layer 14B that are covered by display layer 14A. In general, holes may be located anywhere in TFT layer 14B.

Holes in the TFT layer may be of any suitable size or shape. For example, holes such as holes 50C of FIG. 11 may have a rectilinear shape.

Figure 11:
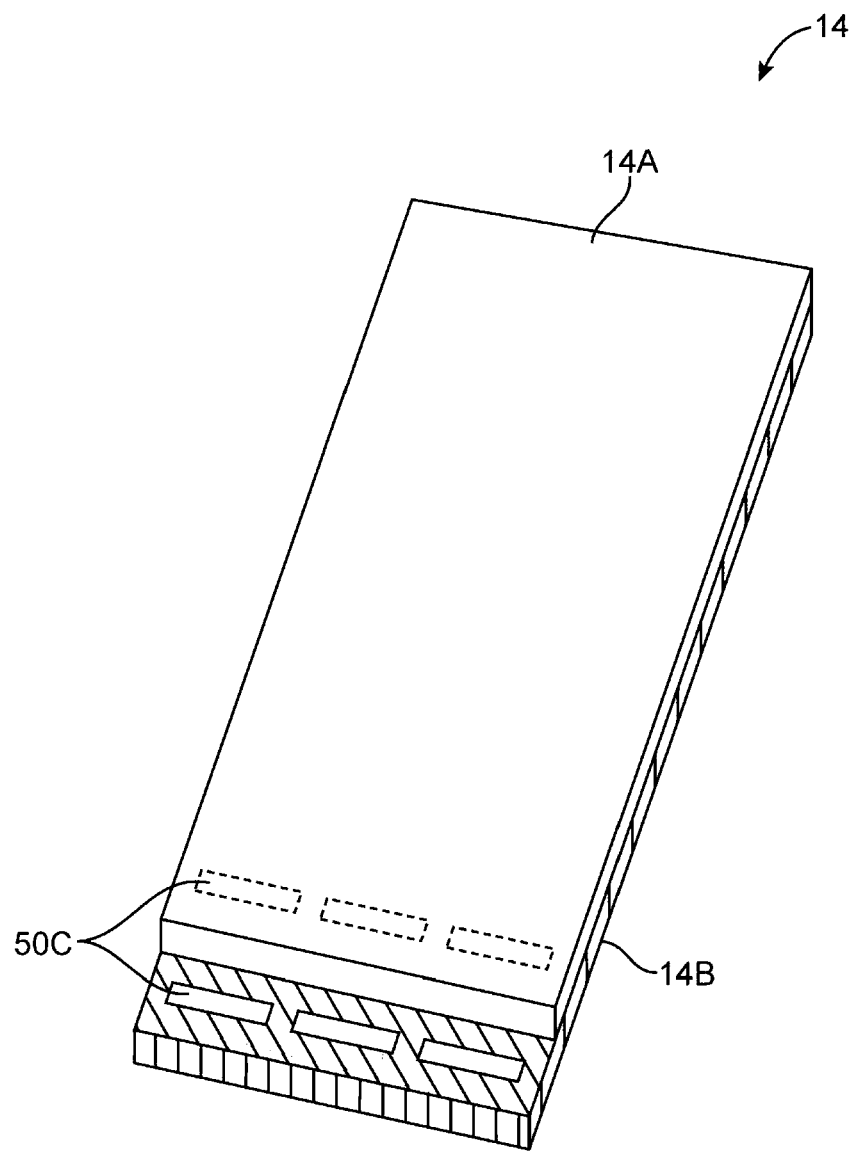
FIG. 11 is a perspective view of an illustrative display having rectilinear holes formed throughout the thin-film transistor layer in accordance with an embodiment of the present invention.
Figure 12:
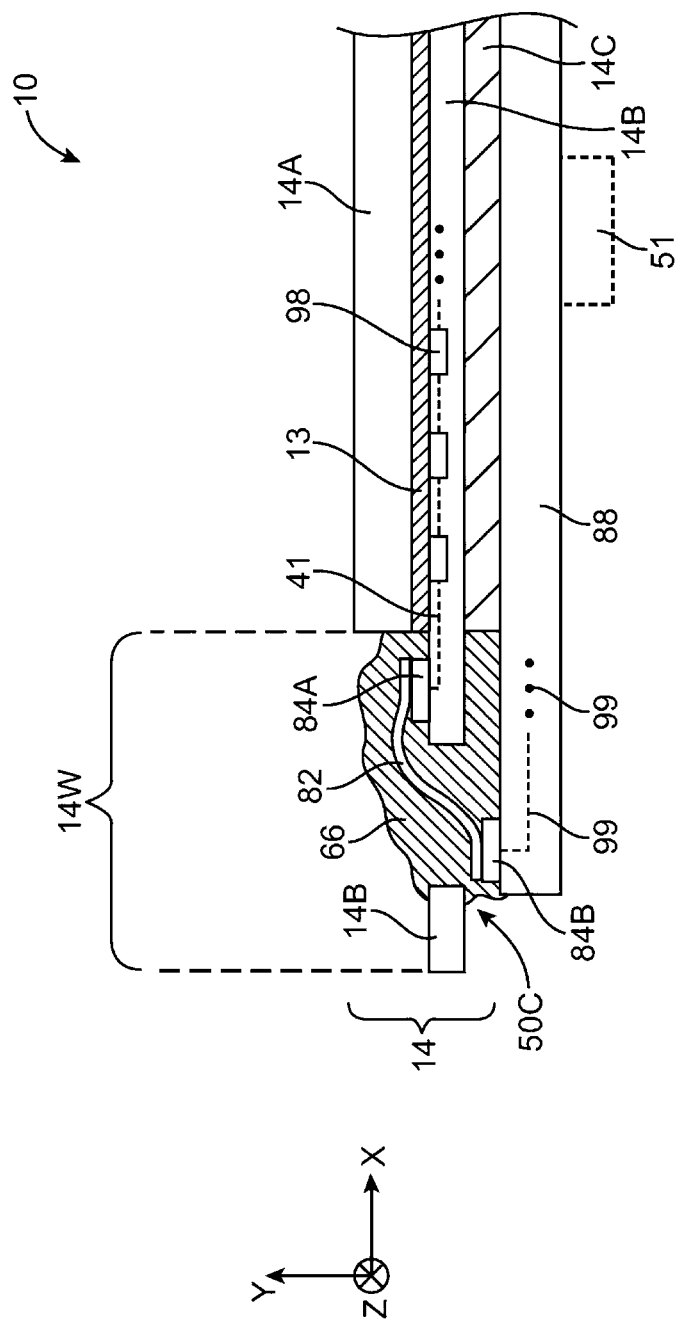
FIG. 12 is a cross-sectional side view of a portion of illustrative electronic device having wire bonds that pass through openings in the thin-film transistor layer of a display in accordance with an embodiment of the present invention.

Holes 50C of FIGS. 9-11 may be used to form a connection path from display circuitry to other device circuitry. Signal lines from display circuitry may be routed through openings 50C in the TFT layer to run along a back side of the display. This may help reduce the width of inactive display area around the border of a display. FIG. 12 is a cross-sectional side view (cross-section taken along axis 85 of FIG. 1) of device 10 in the vicinity of display 14 illustrating how holes such as hole 50C (sometimes referred to as an opening) may help reduce width 14W of inactive display border regions.

In the example shown in FIG. 12, display 14 may be a liquid crystal display (LCD). Display 14 may have multiple layers such as color filter layer 14A, TFT layer 14B, and light source layer 14C. A layer of liquid crystal material such as liquid crystal 13 may be interposed between color filter layer 14A and TFT layer 14B. Light source layer 14C may be a backlight layer that illuminates the liquid crystal material from the back of display 14.

Components on TFT layer 14B such as pixels 98 may be interconnected using traces such as conductive traces 41 (sometimes referred to as control lines). Control lines 41 may be configured to control the array of pixels and may be connected to one or more electrical contacts on TFT layer 14B such as contact pad 84A.

It may be desirable to route signal lines from display circuitry through openings in the display. In some configurations, display circuitry such as driver integrated circuit 51 may be located on the TFT layer as shown in the example of FIG. 9. In the example shown in FIG. 12, driver integrated circuit 51 may optionally be located on a printed circuit under the display such as printed circuit 88 adjacent to light source layer 14C. Control signals from driver integrated circuit 51 may be conveyed to control lines 41 through conductive bridges such as conductive bridge 82 that pass through openings 50C in TFT layer 14B.

Signal lines 99 may be used to distribute control signals from driver integrated circuit 51 to conductive bridge 82. Conductive bridge 82 may be used to convey these control signals from signal lines 99 to control lines 41. Printed circuit 88 may be formed from rigid printed circuit board material (e.g., fiberglass-filled epoxy) or flexible sheets of material such as polymers.

Conductive paths that pass through openings in the TFT layer may have one end that bonds with a contact on the surface of the TFT layer and another end that bonds with a contact on the surface of a printed circuit within the device. In the example shown in FIG. 12, a conductive bridge such as conductive bridge 82 may have one end that bonds with contact pad 84A (on the surface of TFT layer 14B) and another end that bonds with contact pad 84B (on the surface of printed circuit 88).

Conductive bridge 82 may be formed from aluminum, copper, gold, other metals, other suitable conductive materials, a combination or composite of conductive materials, etc. Portions of conductive bridge 82 may include flex circuitry formed from flexible sheets of material such as polymers. Conductive bridge 82 may, in general, be formed using any suitable connector or mounting technology. In the example of FIG. 12, conductive bridge 82 is formed using one or more wire bonds that pass through openings in the display such as opening 50C in TFT layer 14B. Wire bond 82 electrically couples bond pad 84A of TFT layer 14B with bond pad 84B of printed circuit 88. Wire bond 82 passes through openings 50C in TFT layer 14B. This is merely illustrative. Conductive bridge 82 may be formed from other types of conductive connectors. Wire bonding to form conductive bridges 82, as shown in FIG. 12, are sometimes described as an example.

Wire bonds 82 may be formed from wedge bonding, ribbon wedge bonding (e.g., to create a flat ribbon wire), ball bonding, other suitable wire bonding methods, etc. The welding process used to form wire bonds 82 may be facilitated with ultrasonic energy, thermal energy, pressure, or a combination of these forms of energy. Wire bonds 82 may have a diameter of 5-15 microns, 15-25 microns, 25-35 microns, 35-50 microns, or more than 50 microns. For illustrative purposes, the wires used for bonding may have a diameter of 25 microns, defining the minimum size of the contacting area. Alternatively, wires of 32 micron diameter may be used. Materials that may be used in forming wire bonds 82 include Tungsten Carbide, Titanium Carbide, composite materials (e.g., a composite material formed from ceramic and metal), other suitable materials, combinations of these materials, etc.

To improve the reliability of wire bonds 82, potting material 66 may be formed around wire bond 82 in opening 50C. Potting material 66 may also surround the junction between wire bond 82 and contact pad 84A, as well as the junction between wire bond 82 and contact pad 84B.

One or more openings such as opening 50C (sometimes referred to as a hole) may be formed in TFT layer 14B in order to allow conductive bridges such as conductive bridge 82 (sometimes referred to as a wire bond) to pass through TFT layer 14B and couple to printed circuit 88 underneath display 14. Openings in the TFT layer such as opening 50C may be formed using any suitable method (e.g., mechanical-drilling, laser-drilling, inserting a hot element, etc.) and may have any suitable shape (circular, rectilinear, other suitable shape, etc.).

By having conductive bridges such as wire bond 82 pass down through holes in the display layers (parallel to the z-axis marked in FIG. 12) instead of running alongside each other in a single layer (parallel to the y-axis marked in FIG. 12), the width of inactive display area (such as width 14W) around the border of the display may be significantly smaller than that of a conventional display. By positioning printed circuit 88 underneath light source layer 14C, signal lines such as signal lines 99 that distribute signals to control lines 41 may be located under an active portion of a display.

The foregoing is merely illustrative of the principles of this invention and various modifications can be made by those skilled in the art without departing from the scope and spirit of the invention.

What is claimed is:

1. An electronic device, comprising:
   a printed circuit substrate;
   a display having a plurality of display layers, wherein a given layer of the plurality of display layers has an opening and wherein the given layer extends around an entire perimeter of the opening; and
   a conductive structure that passes through the opening in the given layer, wherein the conductive structure electrically couples circuitry on the given layer to circuitry on the printed circuit substrate.

2. The electronic device defined in claim 1 wherein the opening is one of an array of openings on the given layer and wherein the conductive structure is one of a plurality of conductive structures that each pass through a respective one of the openings.

3. The electronic device defined in claim 2 wherein the given layer is a thin-film transistor layer, wherein the thin-film transistor layer extends around an entire perimeter of the opening, and wherein the plurality of conductive structures each pass through a respective one of the openings in the thin-film transistor layer.

4. The electronic device defined in claim 3 wherein the conductive structure comprises a wire bond that passes through the opening in the thin-film transistor layer.

5. The electronic device defined in claim 4 wherein the wire bond has a first end that is coupled to a bond pad on the thin-film transistor layer and a second end that is coupled to a bond pad on the printed circuit substrate.

6. The electronic device defined in claim 5 further comprising:
   potting material that fills the opening and encapsulates the wire bond that passes through the opening.

7. The electronic device defined in claim 3 wherein the conductive structure comprises conductive material that fills the opening and that electrically couples the thin-film transistor layer to the circuitry on the printed circuit substrate.

8. The electronic device defined in claim 3 wherein the thin-film transistor layer comprises a flexible substrate that includes a material selected from the group consisting of: a sheet of polymer and a metal foil.

9. The electronic device defined in claim 1 wherein an additional given layer of the plurality of display layers has an opening and wherein the additional given layer extends around an entire perimeter of the opening.

10. The electronic device defined in claim 1 further comprising:
    a backlight layer interposed between the printed circuit substrate and the given layer.

11. An electronic device, comprising:
    a thin-film transistor layer having a thin-film transistor layer substrate with opposing first and second surfaces, wherein the thin-film transistor layer substrate has an opening that extends from the first surface to the second surface; and
    a printed circuit that comprises signal lines that are coupled to circuitry on the thin-film transistor layer through the opening.

12. The electronic device defined in claim 11 wherein the thin-film transistor layer extends around an entire perimeter of the opening.

13. The electronic device defined in claim 11 wherein an array of display pixels of different colors and control lines are formed on the first surface of the thin-film transistor layer and wherein the control lines are configured to control the display pixels.

14. The electronic device defined in claim 13 wherein at least one of the signal lines passes from the first surface of the thin-film transistor layer substrate to the printed circuit through the opening.

15. The electronic device defined in claim 11 wherein the opening is one of an array of openings in the thin-film transistor layer, the electronic device further comprising:
    conductive material that fills at least some of the openings and that couples the printed circuit to the circuitry on the thin-film transistor layer.

16. An electronic device comprising:
    a printed circuit substrate;
    a thin-film transistor layer having an opening, wherein the thin-film transistor layer extends around an entire perimeter of the opening; and
    conductive material that passes through the opening and that couples the printed circuit substrate to circuitry on the thin-film transistor layer.

17. The electronic device defined in claim 16 wherein the thin-film transistor layer has thin-film transistor circuitry that controls display pixels, the electronic device further comprising:
    a color filter layer that overlaps the thin-film transistor layer to form the display pixels of different colors.

18. The electronic device defined in claim 17 wherein the display pixels of different colors are arranged in an array, the electronic device further comprising:
    a backlight layer interposed between the printed circuit substrate and the thin-film transistor layer, wherein the backlight layer, the printed circuit substrate, and the array of pixels of different colors each overlap each other.

19. The electronic device defined in claim 18, wherein the printed circuit substrate has an upper surface and a lower surface, and wherein the upper surface is interposed between the backlight layer and the lower surface, the electronic device further comprising:
    a driver integrated circuit mounted to the lower surface of the printed circuit substrate, wherein the driver integrated circuit provides control signals to the thin-film transistor circuitry through the conductive material that passes through the opening.

20. The electronic device defined in claim 19 wherein the opening in the thin-film transistor layer is one of a plurality of openings in the thin-film transistor layer and wherein wire bonds pass through at least some of the openings.

* * * * *